No. 616,480. Patented Dec. 27, 1898.
A. G. MEAD.
BICYCLE.
(Application filed Jan. 2, 1897.)
(No Model.) 2 Sheets—Sheet 2.
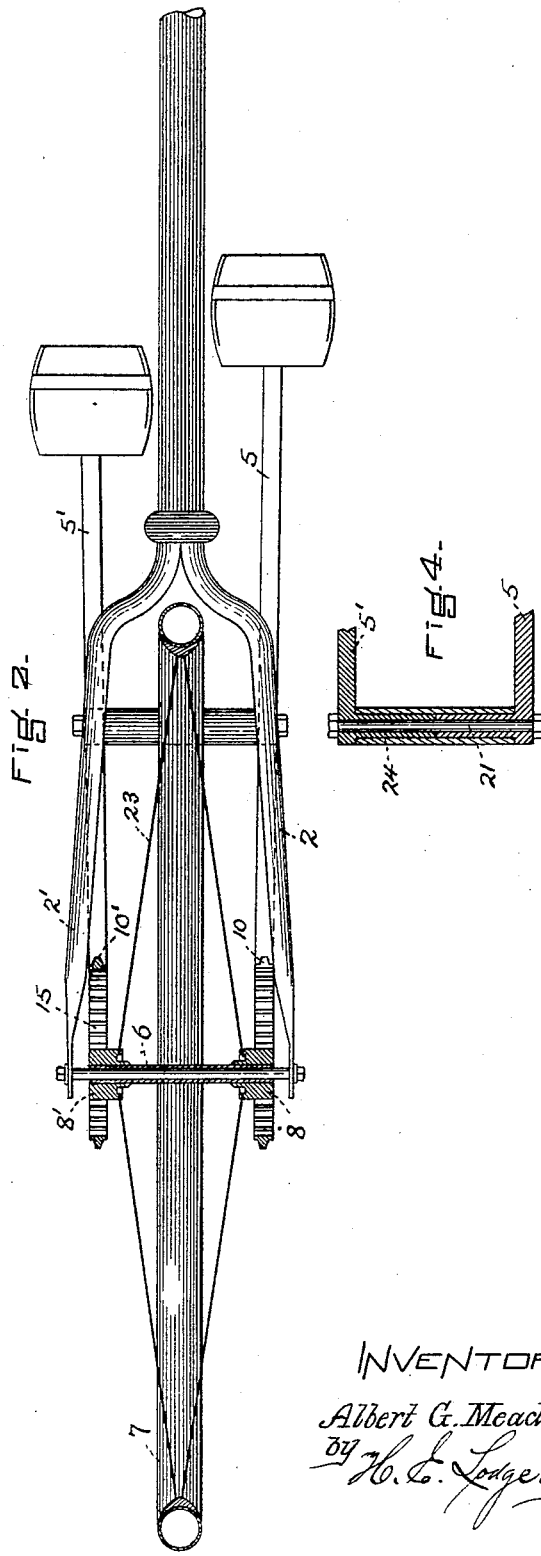
WITNESSES.
INVENTOR.
Albert G. Mead.

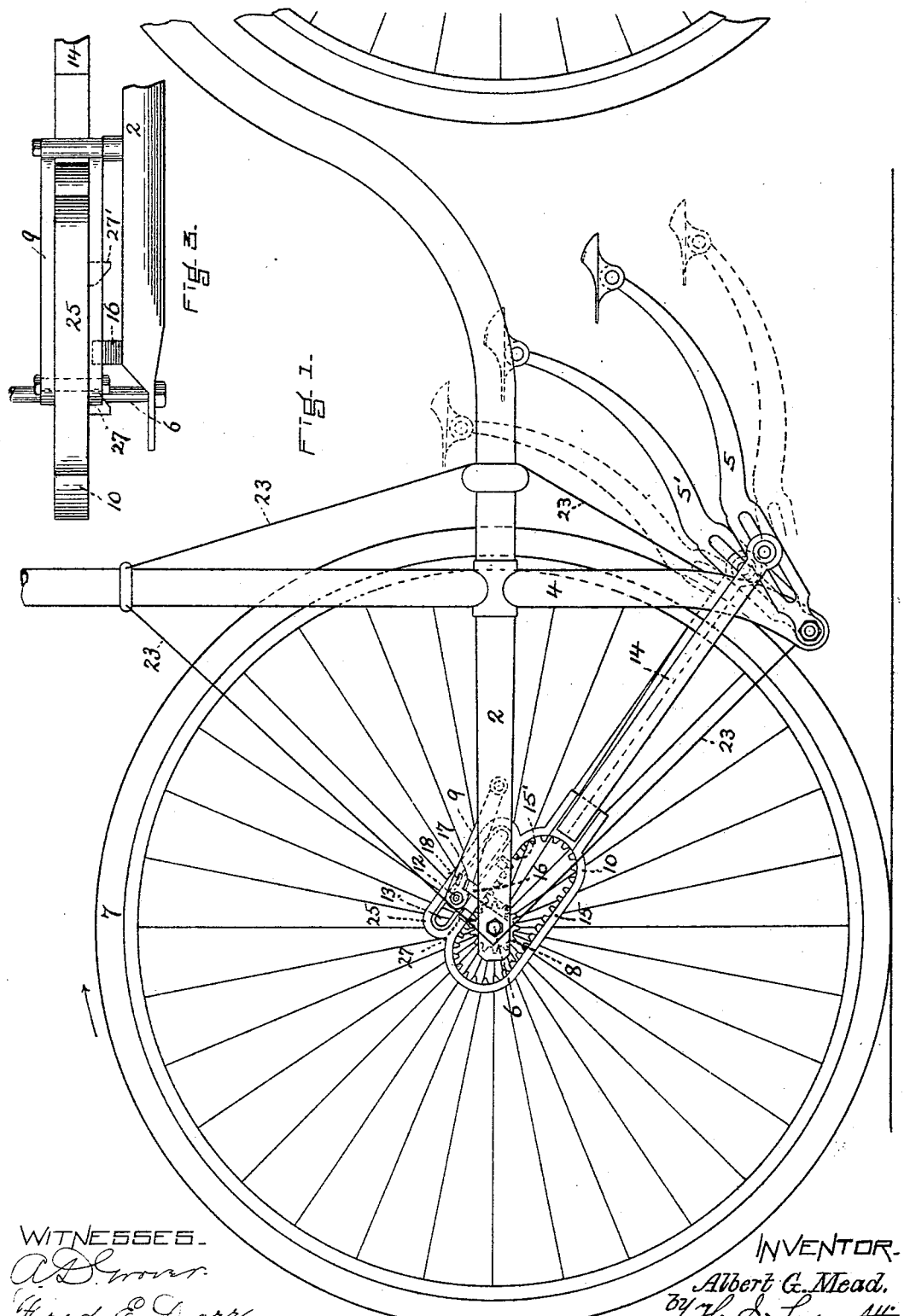

UNITED STATES PATENT OFFICE.

ALBERT G. MEAD, OF MEDFORD, MASSACHUSETTS.

BICYCLE.

SPECIFICATION forming part of Letters Patent No. 616,480, dated December 27, 1898.

Application filed January 2, 1897. Serial No. 617,777. (No model.)

*To all whom it may concern:*

Be it known that I, ALBERT G. MEAD, a citizen of the United States, residing at Medford, in the county of Middlesex and State of Massachusetts, have invented certain new and useful Improvements in Bicycles; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to mechanism for the propulsion of bicycles, and has for its object the avoidance of the usual sprocket wheel and chain and the rotation of the shaft of the rear wheel by positively-acting mechanism of compact and simple form operated by the action of the feet of the rider upon a crank-treadle or foot-lever on each side of the machine and whereby the two foot-levers are interlocked or held together in such a manner that each is compelled to complete its full stroke in rotating the shaft of the rear wheel of the machine. These results are accomplished by the provision on the shaft of the rear wheel of two toothed wheels, each rigidly secured to said shaft, at opposite ends thereof, and each embraced and gearing with an endless rack formed by an elliptical internal gear having two parallel sides and of a width greater than the diameter of the toothed wheels and upon a frame reciprocated through the medium of a connecting-rod by the movement of a foot-lever or crank-treadle and permitted to move vertically by the pivotal attachment of said connecting-rod to the foot-lever or crank-treadle, and also by the provision of a locking device to hold the internal gear in engagement with the toothed wheel during the backward-and-forward movement of the frame and endless rack, but disengaged at the termination of the stroke of the frame and endless rack in either direction, whereby a continuous rotation in one direction is given to the shaft by the alternate movement under the action of the feet of the rider of the foot-levers or crank-treadles.

In the accompanying drawings mechanism is shown by means of which the principle of my invention is carried into effect, in which—

Figure 1 is a side elevation of the rear part of a bicycle having this mechanism attached thereto. Fig. 2 is a view of the same, partly in section. Fig. 3 is a plan view of the frame and endless rack and connected parts shown as a projection from similar parts in Fig. 1, but enlarged; and Fig. 4 is a horizontal central section through the pivot of the driving or foot levers.

In the several figures similar numerals indicate the same parts.

Referring to the drawings, Fig. 1, 2 and 2' represent the rear horizontal portion of a bicycle-frame equipped with a vertical saddle-post which extends below the line of the parts 2 and 2' and forms a pendant 4, to which are pivoted the driving or foot levers 5 and 5', each on opposite sides of the machine and each connected by suitable means to a connecting-rod carrying the endless rack 10, the said rod being pivotally attached to the driving or foot levers. In order to adapt the driving-lever to different lengths of stroke, this pivot may be adjustably supported on the lever in any suitable manner—as, for example, by a slot and holding-bolts, as shown.

On the shaft of the rear wheel 7 and at each end of the same are rigidly secured the toothed wheels 8 and 8', each of which engages with the endless rack on the same side of the machine. This endless rack is formed with two straight parallel sides 15 and 15', upper and lower, respectively, and with rounded ends, which are arcs of circles having equal radii, but greater than the radius of the toothed wheel 8, and this device is well-known in mechanics.

In Fig. 1 the rear wheel is shown as moving as indicated by the arrow. Hence the lever 5 is descending and the toothed wheel 8 is engaging with the upper side 15 of the endless rack and approaching its rear end and the lever 5' is ascending and the other toothed wheel 8' is engaging with the lower side 15' of the endless rack on that side and approaching the front end of the latter, and their positions will be reversed on each side when the lever 5 ascends and the lever 5' descends. It is necessary to provide means for maintaining this toothed wheel in continual engagement with the endless rack and to prevent this rack from moving vertically until the completion of the stroke and on the completion of the stroke to permit the frame carrying the endless rack to move to enable the toothed wheel to engage with the opposite side of the endless rack. This result is accomplished by the provision of an arm 9, which may be bifurcated, as shown, and which is pivotally attached to the bar 2 in front of the shaft of the rear wheel and at its other end is connected to the frame carrying the endless rack by means of a suitable friction-roller 12, attached to the arm 9 and moving in a slot 13 in a guide-plate 25, attached to the said frame and parallel with this frame. During the forward-and-backward movement of this frame the arm 9 is held in such a position as to bring the opposite sides, respectively, of the endless rack in engagement with the toothed wheel by a locking device which engages with said arm; but on the completion of said stroke the locking device must be disengaged to permit the frame to move vertically to effect the engagement of opposite sides of the endless rack with the toothed wheel. A convenient means for accomplishing this result is by the spring-catch formed by the spring 16, attached to the bar 2 and 2' and having a hook thereon, which hook engages alternately with one of two notches 17 and 18, arranged one above the other on the side of the arm 9; but any other suitable form of locking device may be used. The disengagement of the hook from the notch is effected by the contact with the spring 16 of projections or cams 27 and 27' or their equivalents, attached at opposite ends to the frame carrying the endless rack.

In the drawings, Fig. 1, the hook on the end of the spring 16 is shown as engaged in the notch 17 on the arm 9. When on the descent of the foot-lever 5 the center of the toothed wheel 8 becomes coincident with the line through the center of the circle of which the curved ends of the endless rack is an arc, the projection or cam 27 or its equivalent makes contact with the spring 16 and disengages its hook from the notch 17. The frame is now released and the toothed wheel 8 continues to rotate. The frame is raised by the engagement of the toothed wheel 8 with the curved part of the endless rack, and when the said toothed wheel enters upon the lower straight portion 15' of the endless rack the hook on the spring 16 has entered the upper notch 18 and the endless rack is held in engagement with the toothed wheel. This occurs during the return or inactive movement of the lever 5. When this endless rack has reached the opposite extreme position and the center of the toothed wheel 8 is coincident with a line through the center of the circle of which the curved end of the endless rack is an arc, the projection or cam 27' or its equivalent on the other end of the frame carrying the endless rack strikes the spring 16 and releases its hook from the notch 18. The action of the toothed wheel now causes the frame carrying the endless rack to descend, and this frame continues to move endwise until the hook again engages with the notch 17, whereby the toothed wheel is maintained in engagement with the endless rack.

The location of the projections or cams 27 and 27' or their equivalents should be such as to effect the release of the locking device at the termination of each endwise movement in each direction of the endless rack. By this arrangement a positive mechanism is obtained whereby the endless rack is given an endwise reciprocation by its driving lever or crank, and during this movement the endless rack rises and falls to maintain the toothed wheel constantly in engagement with the internal gear, and thus have a steady and uniform continuous movement of rotation.

The device is perfectly automatic and positive in its action.

I am aware that it is not new in mechanism to provide means for maintaining in constant engagement with a toothed wheel an endless rack of substantially the form herein described and having an endwise-reciprocating and vertically-oscillating movement—as, for example, the device shown in Letters Patent of the United States issued to J. S. Herrick July 29, 1890, No. 433,202—but no disengaging devices as described by me are used in connection with these means, and if the parts of the device used by Herrick are made of sufficient size to afford the necessary strength for practical use the vertical movement of the endless rack required to carry the pin around the straight guide must be considerable; but by the use of a disengaging device this vertical movement is much reduced in extent, and consequently this form of holding device can be made more compact than other forms known to the art, which is a great advantage in bicycle construction. I may use a treadle-crank for reciprocating the frame carrying the endless rack, but preferably I employ foot-levers, as shown, and since these levers are in direct line with the propelling mechanism there is no side thrust or lateral torsion produced upon the frame of the bicycle, as occurs in the use of cranks. A further advantage accrues from the fact that the foot has less movement than with a crank. Moreover, by the use of levers the rider always has control of his machine, and there is constantly an effective movement, whereas with the crank the major part of the stroke is very ineffective. The foot-levers have an independent movement, except so far as connected through the shaft of the rear wheel and the connections as described, and these levers may be attached to hollow concentric sleeves 24, which are supported upon the frame and are secured in place by a bolt 21, which extends through said sleeves. The connection of the two levers by means of the shaft of the rear wheel, the toothed wheels 8, and the connection therewith so interlocks the foot-levers that as each moves alternately in opposite directions it is compelled to complete its full stroke.

Having thus described my invention, what I claim, and desire to secure by Letters Patent of the United States, is—

1. The combination, substantially as described, of a rotating shaft a toothed wheel rigidly secured to the shaft, a frame carrying an endless rack having an elliptical internal gear wider than the diameter of the toothed wheel and with parallel sides and engaging with said toothed wheel, means for giving an endwise-reciprocating and a vertically-oscillating movement to said frame, a spring-operated catch attached to the frame supporting the shaft and intermittently acting to hold the toothed wheel in alternate engagement with the upper and lower sides of the endless rack in its reciprocating movement, and means acting by the movement of the reciprocating frame to disengage said catch on the termination of the endwise movement in either direction of the said frame.

2. The combination, substantially as described, of a rotating shaft, a support for the same, a toothed wheel rigidly attached to said shaft, a frame carrying an endless rack having an elliptical internal gear wider than the diameter of the toothed wheel and with parallel sides and engaging with said toothed wheel, means for giving an endwise-reciprocating and vertically-oscillating movement to said frame, an arm pivotally attached at one end to the support for the shaft and at right angles to said shaft and at the other end supported by the reciprocating frame, a catch attached to the support for the shaft alternately engaging with two parts of the arm to hold the toothed wheel in alternate engagement with the upper and lower sides of the endless rack and means on the reciprocating frame acting to disengage the catch from the arm at the termination of the endwise movement in either direction of the said frame.

3. The combination, substantially as described, of a rotating shaft a support for the same, a toothed wheel rigidly attached to said shaft, an endwise-reciprocating and vertically-oscillating frame carrying an endless rack having an elliptical internal gear wider than the diameter of the toothed wheel and with parallel sides and engaging with the toothed wheel, an arm pivotally attached at one end to the support for the shaft and at right angles to said shaft and at the other end supported on the reciprocating frame, a flat spring attached to the support for the shaft and provided with a hook, two notches on the pivoted arm one above the other with which notches the hook on the spring alternately engages on the downward-and-upward movement of the reciprocating frame, and projections or cams on said frame each acting on the said spring at the termination of the endwise movement of the reciprocating frame in either direction to release the hook.

4. The combination, substantially as described, with the reciprocating frame carrying the endless rack 10 of a guide-bar 25 attached to said frame longitudinally parallel therewith, a longitudinal slot 13 in said bar an arm 9 pivotally attached at one end to the support 2 and a roller 12 on the other end of the arm 9 entering the slot 13 and a spring-operated catch attached to the support for the shaft and intermittently engaging with the arm 9.

In testimony whereof I affix my signature.

ALBERT G. MEAD.

In presence of—
H. E. LODGE,
FRED E. DORR.